United States Patent [19]
Baumann et al.

[11] Patent Number: 4,819,385
[45] Date of Patent: Apr. 11, 1989

[54] DEVICE FOR TREATING THE ENDS OF TUBULAR COMPONENTS

[75] Inventors: Gerhard Baumann, Schaffhausen, Switzerland; Herbert Kramer, Singen, Fed. Rep. of Germany

[73] Assignee: Georg Fischer Aktiengesellschaft, Schaffhausen, Switzerland

[21] Appl. No.: 74,556

[22] Filed: Jul. 17, 1987

[30] Foreign Application Priority Data

Jul. 24, 1986 [CH] Switzerland .................. 02969/86

[51] Int. Cl.$^4$ .......................................... B24B 19/00
[52] U.S. Cl. ................................. 51/241 B; 51/241 S; 51/90
[58] Field of Search .............. 51/289 R, 290, 241 R, 51/241 B, 241 S, 251, 90, 166 MH, 273; 269/48.1

[56] References Cited

U.S. PATENT DOCUMENTS

| | | | |
|---|---|---|---|
| 3,031,995 | 5/1962 | Taylor | 269/48.1 |
| 3,067,651 | 12/1962 | Hogden et al. | 51/241 B |
| 4,174,746 | 11/1979 | Walker et al. | 51/241 B |
| 4,200,417 | 4/1980 | Hager et al. | 51/273 |

FOREIGN PATENT DOCUMENTS 0152752  5/1975  European Pat. Off.
2503426  3/1982  Fed. Rep. of Germany.

Primary Examiner—Frederick R. Schmidt
Assistant Examiner—Maurina Rachuba
Attorney, Agent, or Firm—Toren, McGeady & Associates

[57] ABSTRACT

A treating device for mechanically treating the outer circumferential surface of tubular components. The treating device includes a grinding tool and is rotatably mounted on an internal chuck. The internal chuck is chucked by means of chuck jaws concentrically relative to the inner diameter of the tubular component. The grinding tool includes a drive shaft and a drive motor and is eccentrically mounted in a bushing which can be swivelled by means of a worm drive. By swivelling the grinding tool, the grinding tool is moved toward the tubular component for the appropriate processing depth. Subsequently, the outer surface of the tubular component is treated by rotating the treating device about the internal chuck.

9 Claims, 3 Drawing Sheets

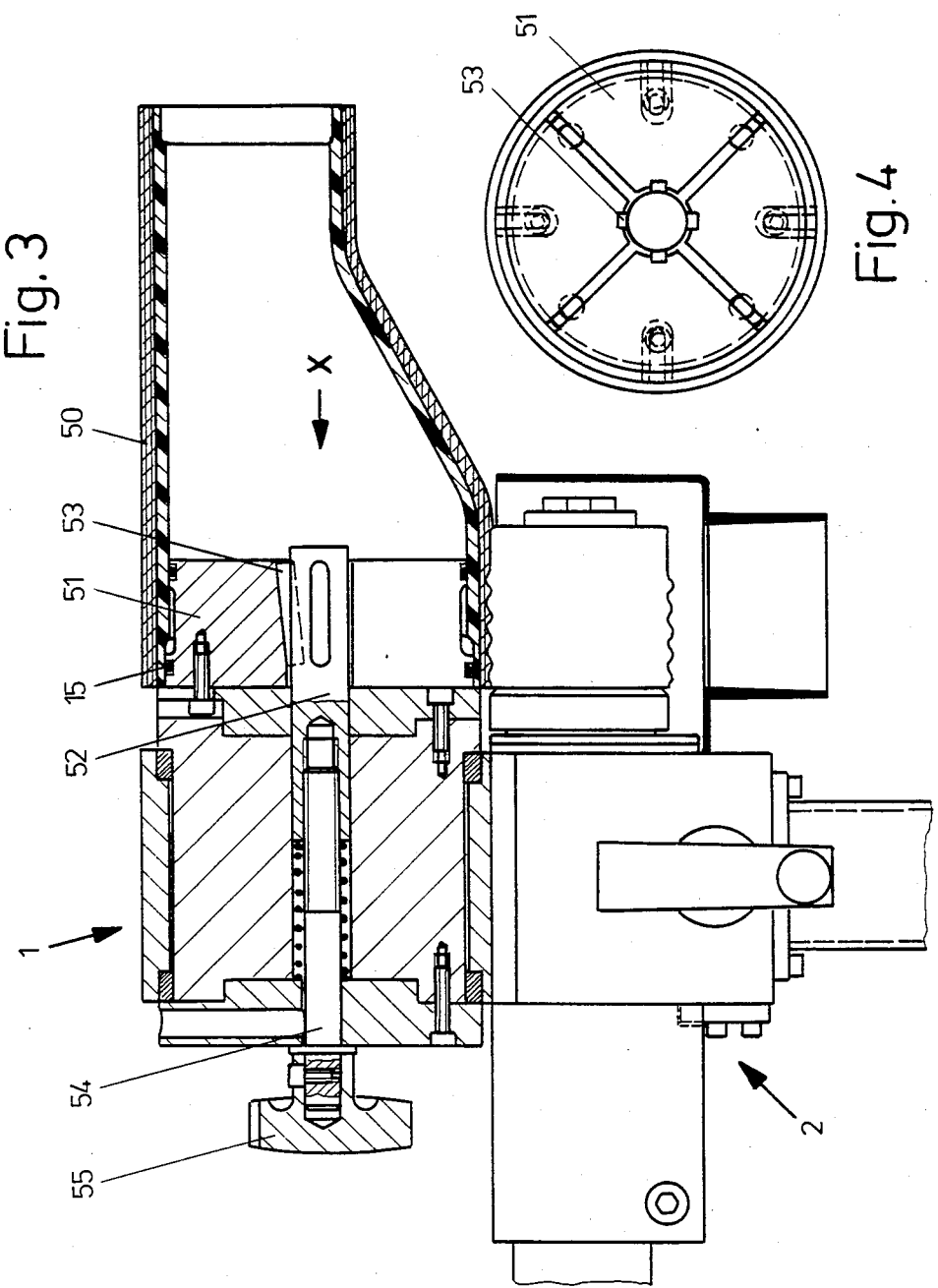

DEVICE FOR TREATING THE ENDS OF TUBULAR COMPONENTS

BACKGROUND OF THE INVENTION

1. Field of the Invention

The present invention relates to a device for treating the ends of tubular components. The invention relates particularly to a device for making grooves in the outer circumference of plastic pipes and fittings. The device includes a rotatable treating tool which is movable relative to the circumference of the pipe. The treating tool is adjustable in radial direction toward the pipe.

2. Description of the Prior Art

DE-C3-2503426 discloses a device for cutting pipes. This prior art device includes a stationary vise which engages the outer circumference of the pipe and a rotatable cutting tool which is movable about the pipe and is radially adjustable toward the pipe.

In order to manufacture connections of fiber-reinforced plastic pipes, as described in EP-A2-0152752, it is necessary to provide circumferentially extending grooves at the ends of the pipes after the pipes have been cut to the desired length.

Since pipes of this type and fittings are not very uniform on the outer periphery due to the glass fiber laminate applied thereon, and since a concentric connection with respect to the inner diameter is required, a device as it has been described above can be used for such tubular components.

It is, therefore, the primary object of the present invention to provide a device of the above-mentioned type in which a treatment of the end of a tubular component is ensured which is concentric with respect to the inner diameter. In addition, the device is to be so small and easily manageable that it can be used at the location where the pipeline system is to be placed.

SUMMARY OF THE INVENTION

In accordance wtih the present invention, the device for mechanically treating the ends of tubular components of the type described above includes an internal chuck which is capable of being centered by contacting the inner circumference of the pipe. The treating tool is mounted on a rotary body which is supported so as to be rotatable concentrically with the internal chuck.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawing:

FIG. 3 shows, partially in longitudinal section, another embodiment of the device according to the invention with a different internal chuck for fittings; and FIG. 4 is a partial view of the device as seen in the direction of arrow X in FIG. 3.

DETAILED DESCRIPTION OF THE INVENTION

Figure 1:
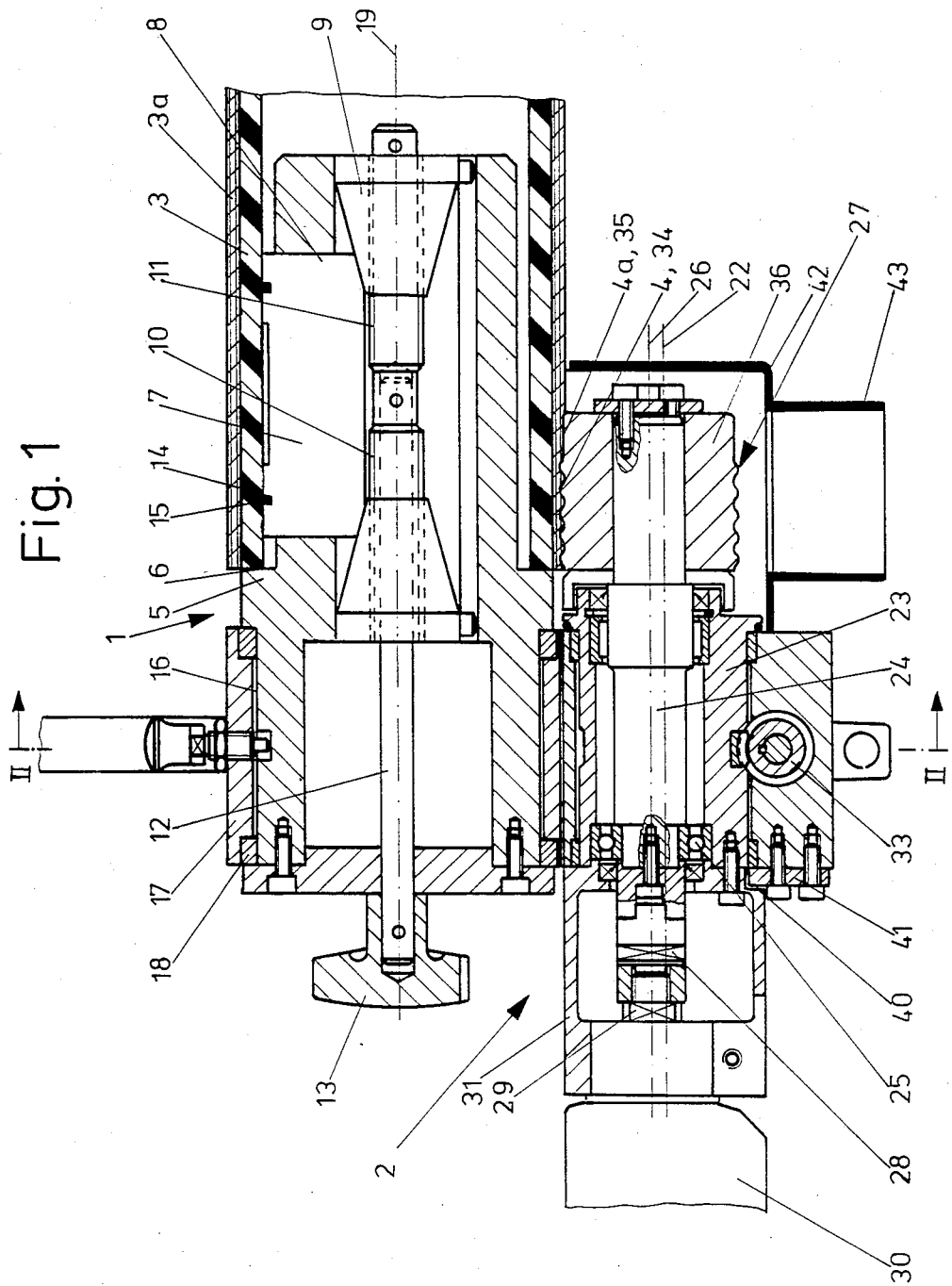
FIG. 1 is a longitudinal sectional view of the device according to the invention.

As illustrated in FIG. 1 of the drawing, the device according to the invention includes an internal chuck 1. Mounted on internal chuck 1 is a treating device 2 for making circumferentially extending grooves 4 in a plastic pipe 3 reinforced with glass fiber laminate 3a. Internal chuck 1 includes a chuck member 5 which is inserted with one of its ends into the pipe 3 to be treated until a stop surface 6 rests against the pipe. Chuck member 5 is secured to the pipe by means of chuck jaws 7.

A plurality of circumferentially distributed chuck jaws 7 are guided in slots 8 formed in chuck member 5. Chuck jaws 7 are pressed outwardly for chucking means of two conical members 9 which are directed and axially movable toward each other. One of the conical members 9 has an internal left hand thread 10 and the other conical member 9 has an internal right hand thread 11 for engagement by an actuating rod 12. By rotating the actuating rod 12 by means of a handle 13, the conical members 9 are axially moved from the inner circumference of the pipe.

Two circumferentially extending rubber rings 15 are placed in grooves 14 formed in the outer surfaces of all chuck jaws 7. The radially directed tensional force of the rubber rings 15 pushes the chuck jaws 7 inwardly when the conical members 9 are moved axially apart. Chuck jaws 7 are preferably made of a plastics material having good static friction properties.

Chuck member 5 has a bearing seat 16. A rotary body 17 composed of two parts 17a and 17b is rotatably mounted about axis 19 on bearing seat 16. Friction bearing rings 18 preferably consisting of plastics material are placed between bearing seat 16 and part 17a of rotary body 17.

Figure 2:
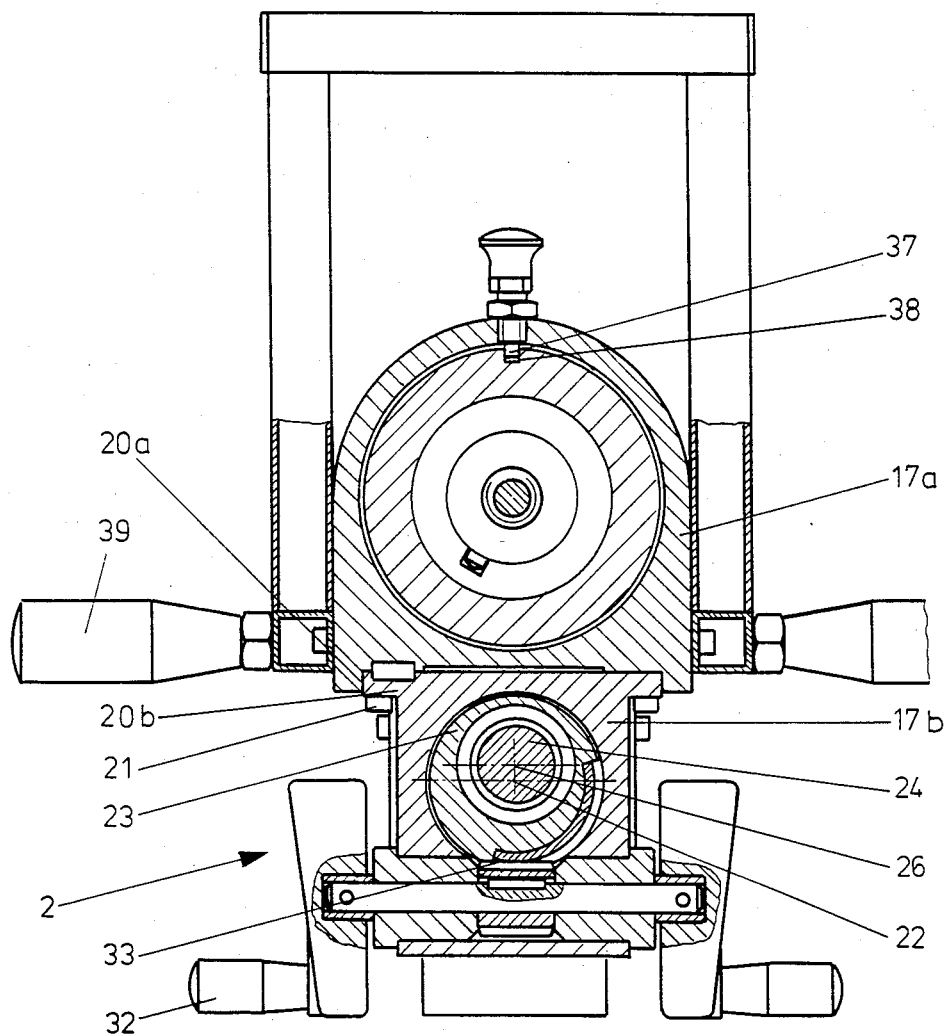
FIG. 2 is a sectional view taken along sectional line II—II of FIG. 1.

As can be seen in FIG. 2, the first party 17a of rotary body 17 mounted on chuck member 5 includes a guide portion 20a in which the second part 17b is laterally fixed by means of a portion 20b and is fastened so as to be adjustable in axial direction by means of screws 21. Part 17b of rotary body 17 forms the support for the treating device 2, so that the treating device 2 can be removed as a whole from the internal chuck 1 and, thus, is easily replaceable. A bushing 23 is mounted in part 17b so as to be rotatable about an axis 22. A drive shaft 24 is mounted in bushing 23 by means of bearings 25, wherein the axis 26 of bearings 25 extends eccentrically relative to axas 22.

The treating tool constructed as a grinding tool 27 is fastened to an end of drive shaft 24. The other end of drive shaft 24 is connected by means of a coupling 28 to a drive shaft 29 of a drive motor 30. Drive motor 30 preferably is an electrically or pneumatically driven hand-held drilling machine which is fastened to the swivelling bushing 23 by means of a clamping member 31. Bushing 23 can be swivelled, preferably by 90°, by means of a worm drive 33 actuated by cranks 32. A groove 40 having the appropriate length together with a stop cam 41 form the stops for the two end positions of bushing 23.

The grinding tool 27 is composed of a metal base body 36 having a grooved surface portion 34 and a cylindrical surface portion 35. Segments of the outer circumference of base body 36 are coated with diamond splinters. The uncoated portions between the individual segments form so-called flutes extending in axial direction which facilitate a better removal of the grinding particles. Grinding tool 27 is surrounded by a protective hood 42 which is provided with a connecting pipe piece 43 for connection to a device for sucking off the grinding particles.

After the internal chuck 1 has been inserted in the plastic pipe 3 to be treated, the device is chucked concentrically with respect to the inner diameter of the pipe by rotating handle 13. The drive for the grinding tool is then switched on and, by turning crank 32, the grinding tool is moved toward the pipe until the depth of the grooves 4 predetermined by the stop is reached. This movement of the grinding tool takes place along a circular arc having a radius R which corresponds to the eccentricity of axis 26 of the drive shaft relative to the axis 22 of the bushing. During the movement of the grinding tool, rotary member 17 and, thus, treating device 2 are held on internal chuck 1 secured against rotation by means of a locking pin 37. After locking pin 37 has been pulled out of bore 38, treating device 2 is manually rotated about pipe 3 by means of handles 39, so that grinding tool 27 produces grooves 4 and a seat 4a in pipe 3.

FIGS. 3 and 4 of the drawing show another embodiment of the device according to the present invention. In this embodiment, internal chuck 1 is constructed specifically for fittings 50 having a short inner cylindrical portion. Treating device 2 corresponds to the one described with respect to FIGS. 1 and 2. The treating device 2 can be connected to different internal chucks for pipes or fittings having different diameters. Due to the short available length, chuck jaws 51 are constructed in the form of segments and are pressed outwardly by means of wedges 53 mounted on a pull rod 5. Pull rod 52 is axially moved by means of a handle 55 arranged on a threaded rod 54. The rings 15 serve to press chuck jaws 51 inwardly.

In all embodiments of the device according to the invention it is ensured that grooves, keyways, seats or similar shapes can be prepared on the outer circumference of pipes or fittings in such a way that they are always concentric with respect to the inner diameter of the pipes or fittings because of the internal chucking of the device.

The treating tool may also be a milling or sawing tool.

The entire device is constructed so small and easily manageable that it can be used at the location where the pipes are to be placed.

While specific embodiments of the invention have been shown and described in detail to illustrate the application of the inventive principles, it will be understood that the invention may be embodied otherwise without departing from such principles.

We claim:

1. In a device for treating the ends of tubular plastic components such as pipes and fittings by making grooves in the outer circumferential surface thereof, including a rotatable treating tool movable relative to the tubular component circumference, the treating tool being movable in radial direction toward the tubular component, the improvement comprising an internal chuck capable of being centered by contacting the inner circumference of the tubular component, a rotary body supporting the treating tool, the rotary body being supported so as to be rotatable concentrically with the internal chuck, a drive shaft for the treating tool, a bushing rotatably mounted in the rotary body, the drive shaft being mounted eccentrically relative to the bushing and two stops for the bushing, a range existing between the two stops, wherein the bushing is adjustable by means of a worm drive in the range of the two stops.

2. The device according to claim 1, wherein the bushing includes an electric, pneumatic or hydraulic drive motor.

3. The device according to claim 1, wherein the treating tool is a grinding tool coated on its circumference in the form of segments with diamond splinters.

4. The device according to claim 3, wherein the grinding tool has on its circumference a grooved surface portion and a cylindrical surface portion.

5. The device according to claim 1, wherein the internal chuck includes a plurality of chuck jaws which are radially movable by means of at least one concentrically arranged, axially movable conical member.

6. The device according to claim 5, wherein the internal chuck includes two oppositely directed conical members, one of the conical members defining an inner left-handed thread and the other conical member defining an inner right-handed thread, an actuating rod extending through and engaging the left-handed and right-handed threads, so that the actuating rod is capable of moving the conical members axially in opposite directions.

7. The device according to claim 5, wherein at least two rubber rings are arranged on the outer surfaces of the clamping chucks, so that the clamping chucks are capable of being forced inwardly by the rubber rings.

8. The device according to claim 1, wherein the treating tool is surrounded by a protective hood, the protective hood including a connecting pipe piece for connection of a suction device.

9. The device according to claim 1, wherein the rotary body is composed of first and second parts, the first part supporting the treating tool and a drive for the treating tool, the second part being mounted on the internal chuck, the first part being replaceably attached by means of screws to the second part.

* * * * *